March 26, 1957     E. R. McCLELLAND     2,786,562
FRUIT POSITIONING APPARATUS

Filed Aug. 12, 1952     11 Sheets-Sheet 1

INVENTOR
ETHERIDGE R. McCLELLAND
BY Harper Allen
ATTORNEY

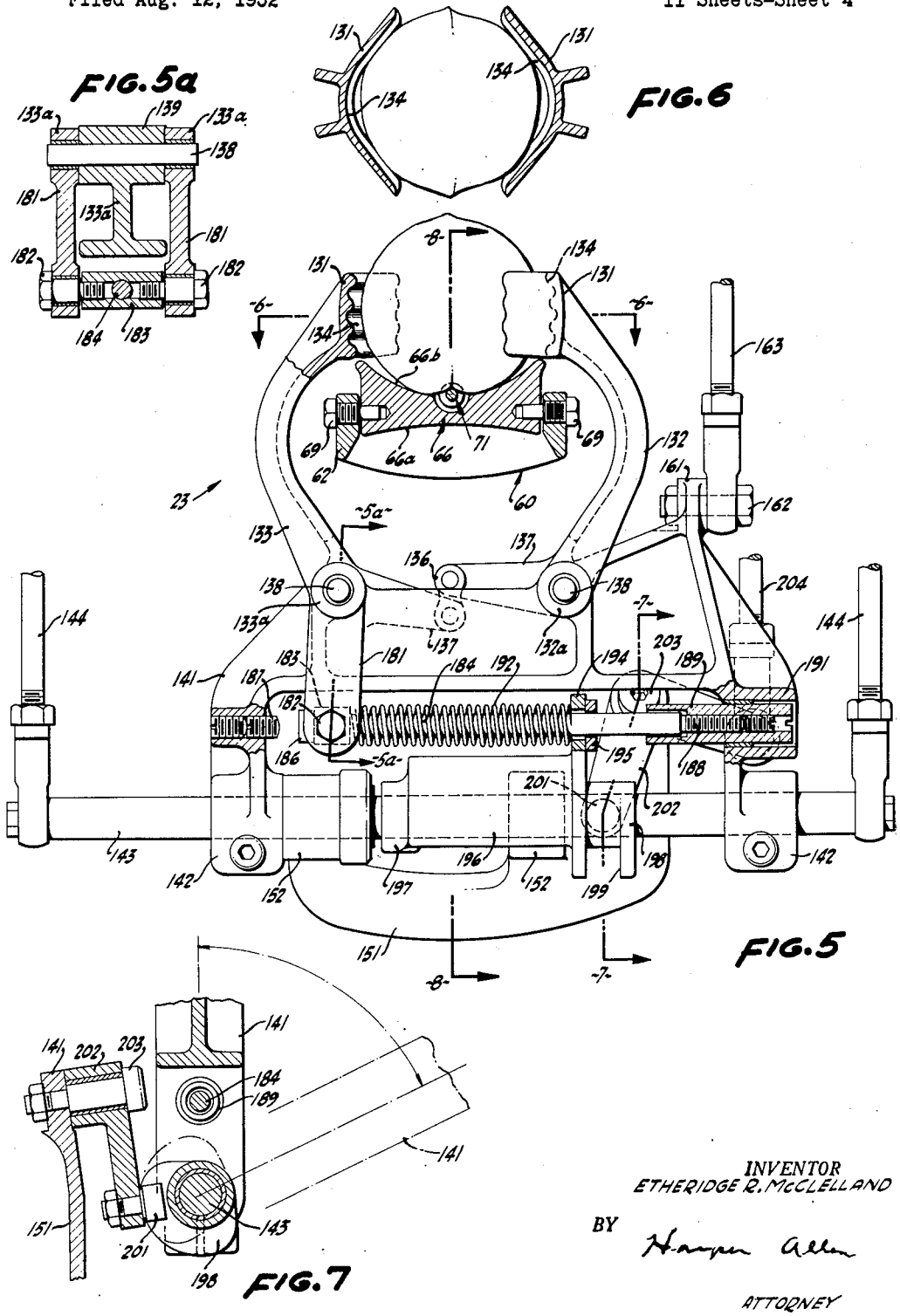

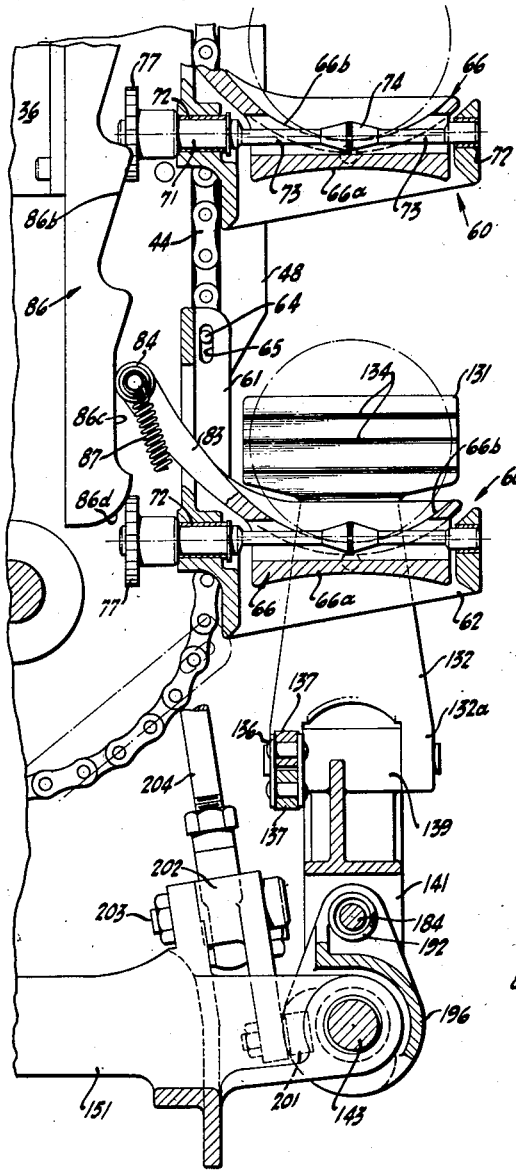

FIG. 10

March 26, 1957  E. R. McCLELLAND  2,786,562
FRUIT POSITIONING APPARATUS
Filed Aug. 12, 1952  11 Sheets—Sheet 8

INVENTOR.
ETHERIDGE R. McCLELLAND
BY
ATTORNEY

March 26, 1957 E. R. McCLELLAND 2,786,562
FRUIT POSITIONING APPARATUS
Filed Aug. 12, 1952 11 Sheets-Sheet 9
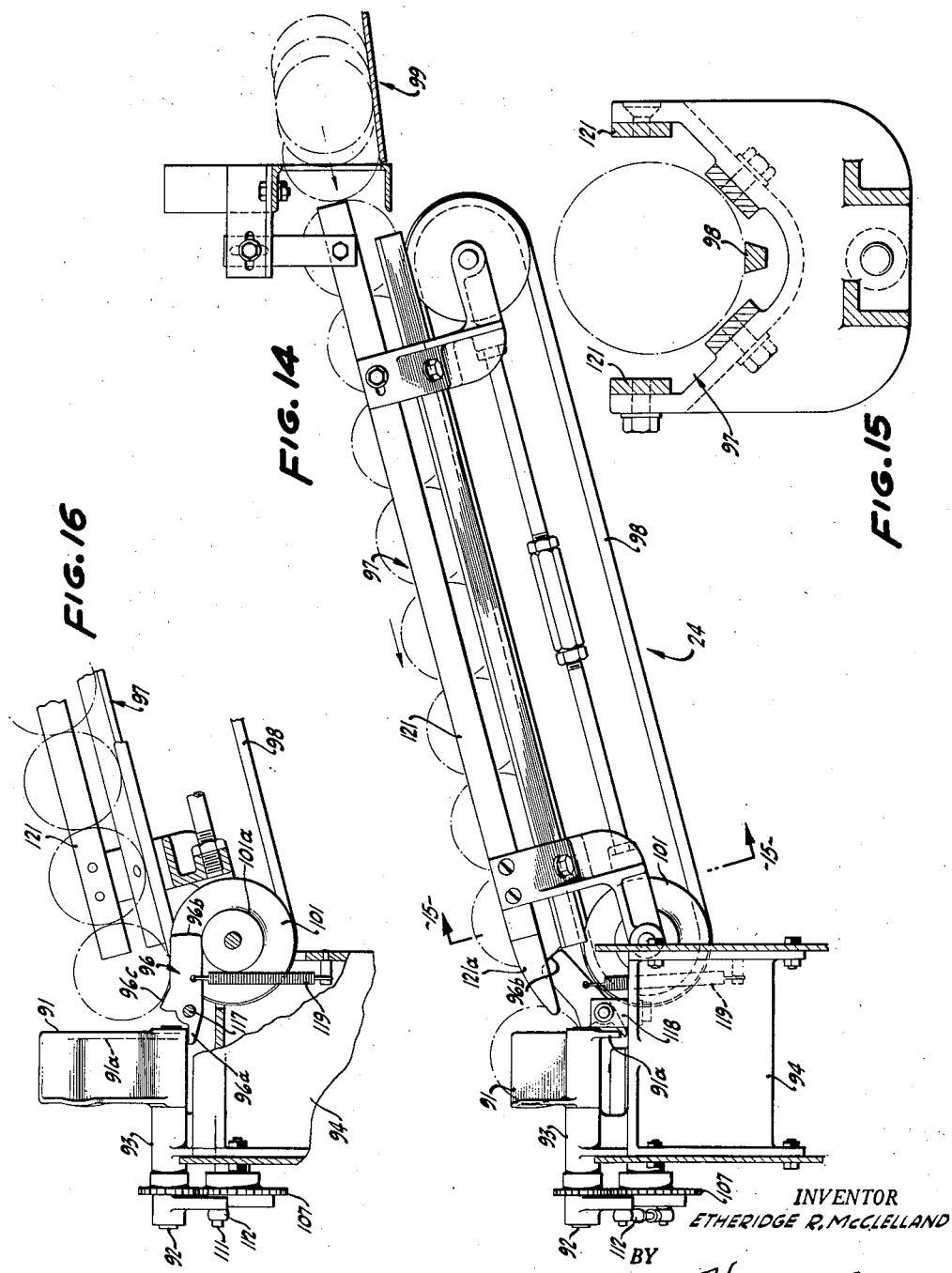
INVENTOR
ETHERIDGE R. McCLELLAND
BY
Harper Allen
ATTORNEY

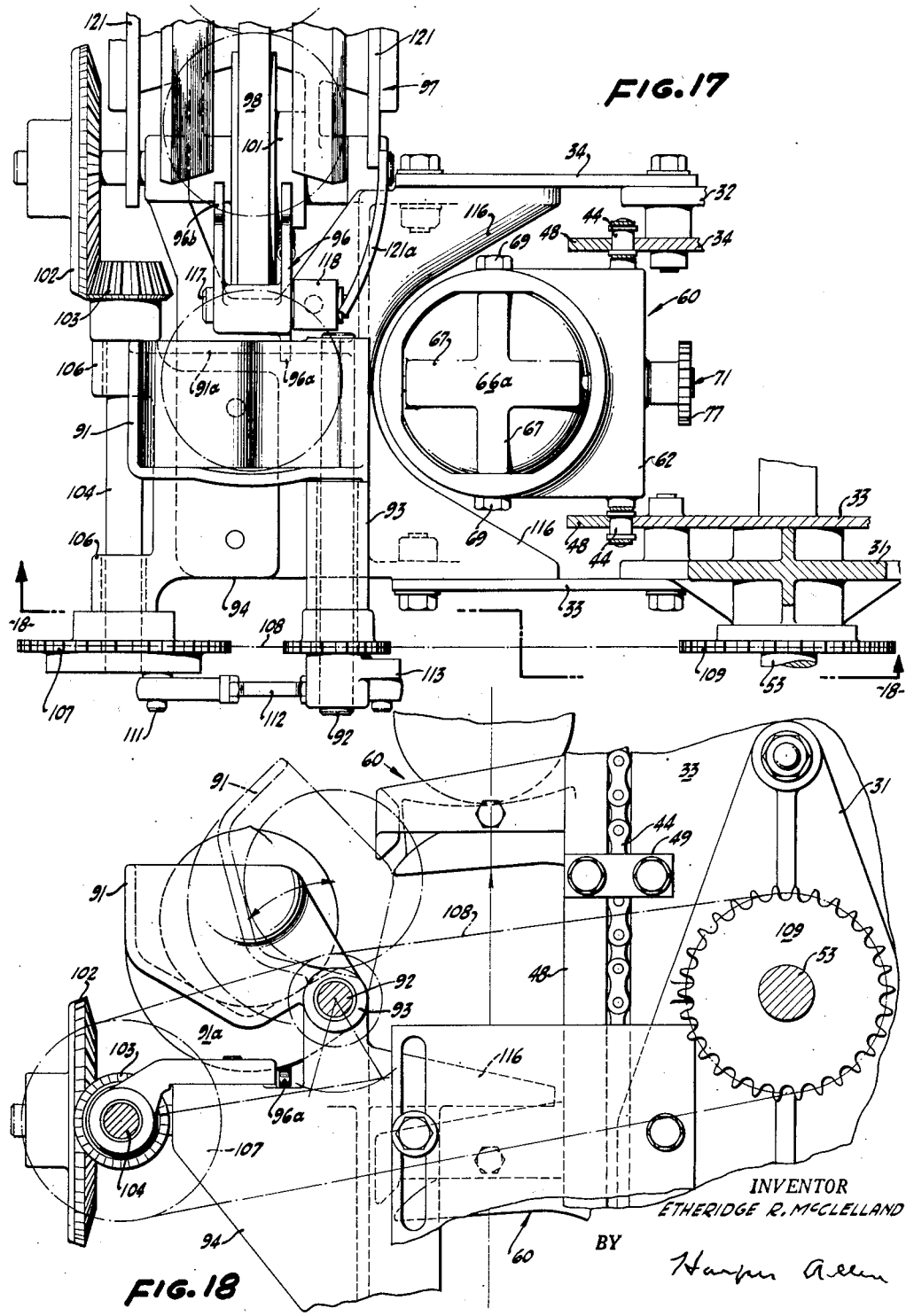

March 26, 1957  E. R. McCLELLAND  2,786,562
FRUIT POSITIONING APPARATUS
Filed Aug. 12, 1952   11 Sheets-Sheet 11

INVENTOR.
ETHERIDGE R. McCLELLAND
BY
ATTORNEY

United States Patent Office 2,786,562
Patented Mar. 26, 1957

2,786,562

FRUIT POSITIONING APPARATUS

Etheridge R. McClelland, San Pablo, Calif., assignor to Fruit Machinery Company, a corporation of Nevada Application August 12, 1952, Serial No. 303,913

21 Claims. (Cl. 198—33)

The present invention relates to apparatus for the positioning or orientation of fruit articles and is concerned more particularly with apparatus of the above character in which the fruit such as peaches is automatically oriented as it is being conveyed to a feed position and then is fed to a pitting mechanism.

It is the general object of the invention to provide orienting means of a vertical character which provides for an improved orienting action, economy of space in a cannery, for ease of feeding of the fruit, and which facilitates transfer to the pitting mechanism.

It is another general object of the invention to provide an orienting device for fruit articles in which the fruit is moved advantageously to secure fast location of the stem cavity of fruit and in which the fruit is then rapidly positioned to align the fruit with respect to its suture line.

Another general object of the invention is to provide improved transfer means for taking fruit from an oriented position and placing it in properly oriented position in the pitter for the pitting operation.

Other objects and advantages of the invention will be apparent from the following description of a preferred embodiment thereof, as illustrated in the accompanying drawings, in which:

Figure 5 is a sectional elevational view taken as indicated by the line 5—5 in Figure 13.

Figure 5a is a detail section on the line 5a—5a of Figure 5.

Figure 6 is a fragmentary sectional view taken as indicated by the line 6—6 in Figure 5.

Figure 7 is a fragmentary sectional view taken as indicated by the line 7—7 in Figure 5.

Figure 8 is a sectional elevational view taken as indicated by the line 8—8 in Figure 5.

Figure 9 is a view similar to Figure 8 illustrating different positions of the orienting pockets.

Figure 10 is a view similar to Figure 5 but showing the transfer jaws open with respect to a peach.

Figure 14 is a view of the feed mechanism taken as indicated by the line 14—14 in Figure 1.

Figure 15 is a fragmentary sectional view taken as indicated by the line 15—15 in Figure 14.

Figure 16 is a fragmentary sectional view similar to Figure 14.

Figure 17 is a horizontal sectional view taken as indicated by the line 17—17 in Figure 1.

Figure 18 is a sectional view taken as indicated by the line 18—18 in Figure 17.

Figure 1:
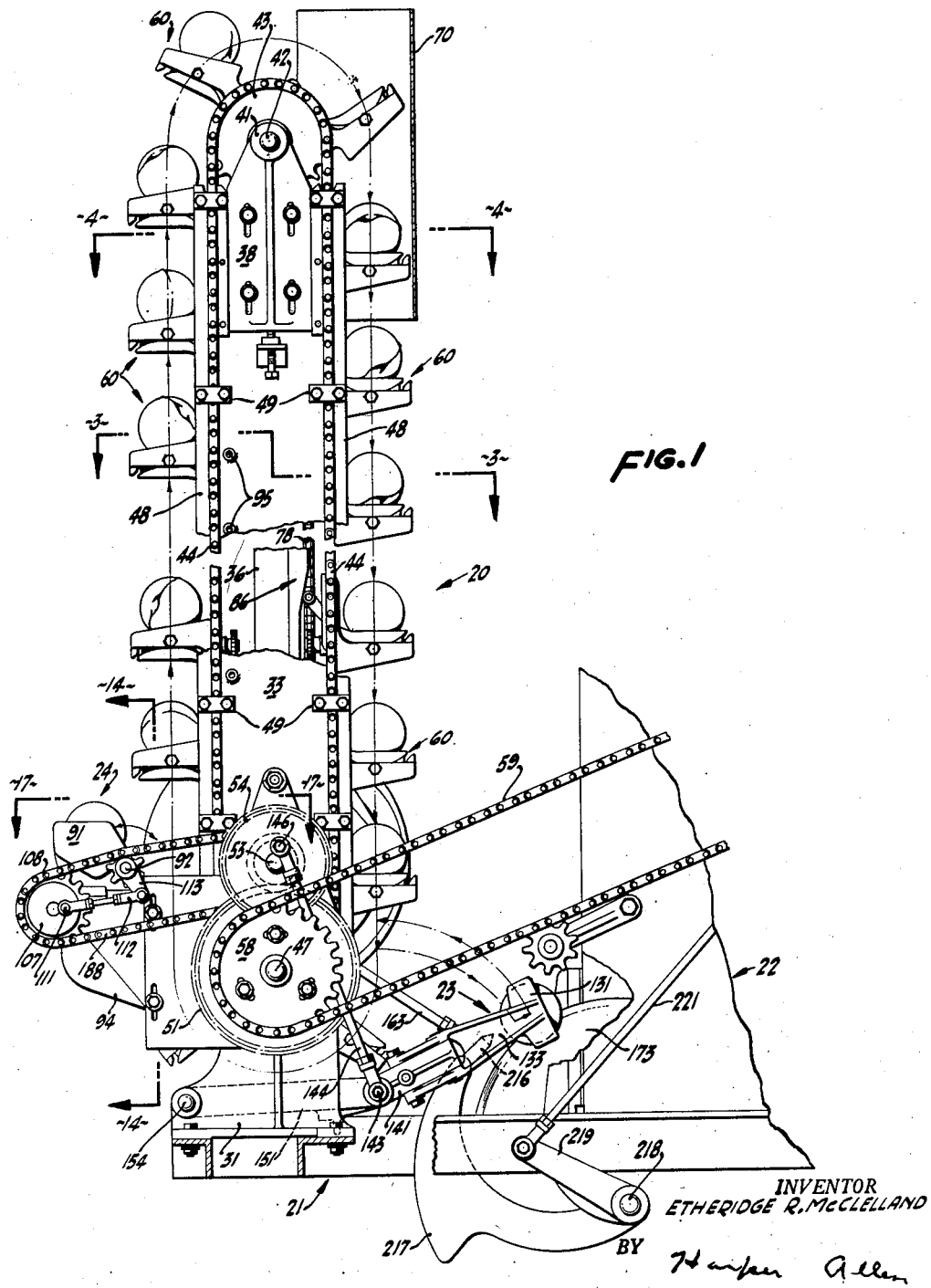
Figure 1 is a side elevational view of the orienting apparatus.
Figure 2:
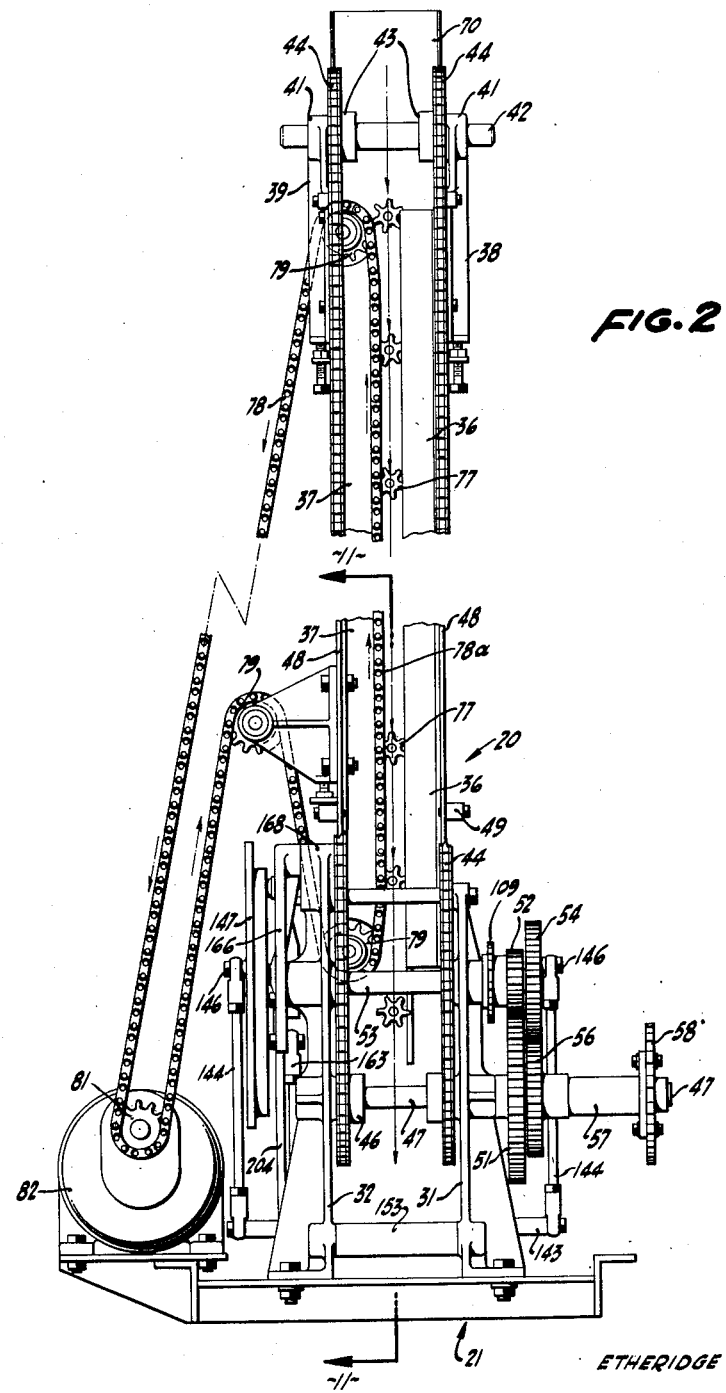
Figure 2 is an end elevational view with the orienting pockets omitted from the view.
Figure 3:
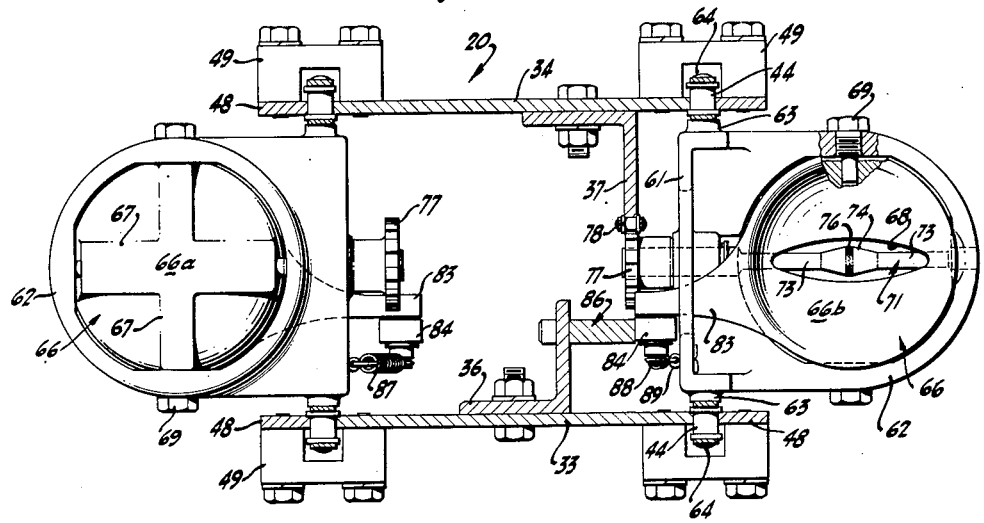
Figure 3 is a horizontal sectional view taken in planes indicated by the line 3—3 in Figure 1.
Figure 4:
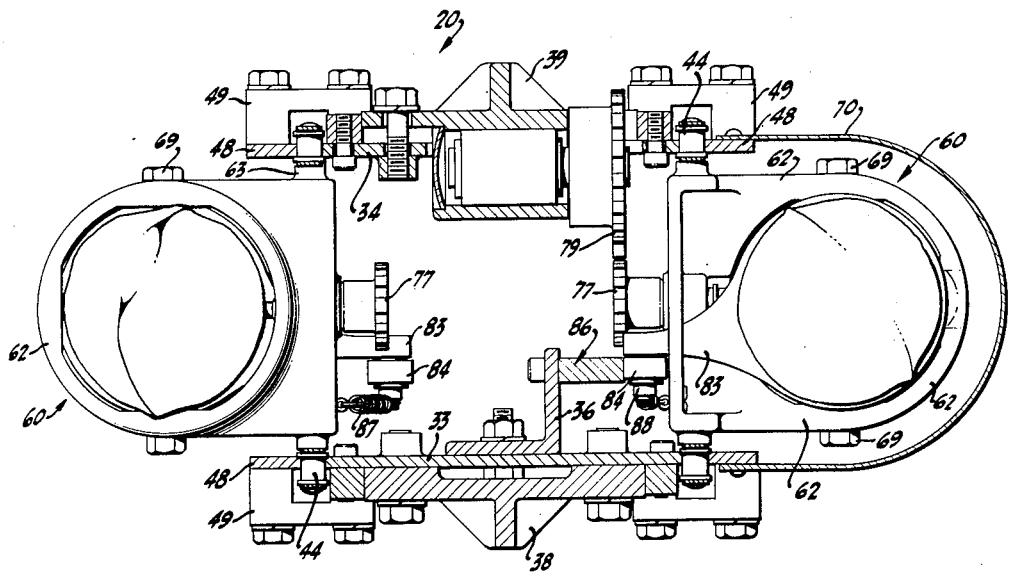
Figure 4 is a horizontal sectional view taken as indicated by the line 4—4 in Figure 1.

Referring to Figures 1 and 2, the orienting and positioning apparatus of the instant invention includes generally an orienting unit 20 supported in upright position on a framework 21 secured to a peach pitter 22 of conventional construction. A transfer mechanism 23 is provided for effecting transfer of oriented fruit from the orienting unit 20 to the pitter 22, and the orienter is fed by a feed unit 24 which supplies one peach at a time to the orienting unit 20.

The orienting unit 20 as stated above is of the upright type, and as shown herein, occupies no more floor space with reference to the peach pitter than that occupied by an operator manually feeding fruit to the pitter. The orienting unit 20 comprises generally an endless series of pocket structures carried vertically up through a path in which fruit may be fed thereto and then vertically downward through an orienting path, during which the orientation of the fruit is accomplished, first with respect to location of the fruit by the stem indent in the fruit and thereafter location of the fruit with respect to its suture line, so that the fruit will be in proper position when it is transferred to the pitting unit to be split in a plane containing the natural division between the two pit halves of the fruit. The orienting unit 20 (Figures 1, 2, 3 and 4) has a frame structure including two opposed upright base castings 31 and 32 secured to and above the framework 21, and respective side plates 33 and 34 secured adjacent the upper end of the respective base castings 31 and 32 and extending upwardly therefrom. Side plates 33 and 34 are provided with stiffening angles 36 and 37, respectively, which also serve as mounting brackets. At the upper end of the respective side plates 33 and 34, there are provided journal brackets 38 and 39 adjustably secured thereon and carrying at the upper end respective bosses 41 for the support shaft 42 of a pair of idle sprockets 43 for respective parallel chains 44 which extend downwardly and are trained about a pair of drive sprockets 46 mounted on a drive shaft 47 carried in suitable bosses of the base castings 31 and 32. To insure linear travel of the stretches of the chains 44 extending between the respective sprockets, guide strips 48 are secured in spaced relation at either edge of respective plates 33 and 34 by suitable brackets 49 spanning the portions of chain passing therethrough.

The drive for the shaft 47 is through a gear 51 (Figure 2) secured thereon which meshes with a smaller gear 52 on a second drive shaft 53 journalled in suitable bosses of the base castings 31 and 32, the shaft 53 also carries a gear 54 meshing with a gear 56 journalled on the drive shaft 47 and connected to a sleeve 57 carrying a drive sprocket 58. As seen in Figure 1, the drive sprocket 58 is connected by a chain drive 59 to suitable driving mechanism of the pitter 22.

The endless series of orienting devices or pocket structures carried by the respective chains 44 are operated to secure a rapid hunting and location of the stem indent of the fruit placing the indent in a desired position, and then to provide for automatic alignment of the suture line of the fruit in a given position. In the embodiment shown, this desired position is with the plane of the suture passing through the desired plane of splitting of the fruit and is parallel to the plane of the view in Figure 1 and with the stem-blossom axis of the fruit vertical, the stem cavity being located downward. As seen in Figures 1, 3, 4 and 8, the chains 44 carry a series of equally spaced apart pocket structures 60 which have fruit receiving pockets on either side thereof, one pocket being effective during the feed of the fruit to the orienting mechanism and the other pocket being effective during orientation of the fruit. Each pocket structure 60 comprises an L-shaped frame 61—62 having a pair of aligned bosses 63 at one end, by means of which it is pivoted on a pair of aligned extended pivot pins 64 of the chains 44. The frame portion 61 extends along the chain and at the other end is provided with a pair of slots 65 engaging a second pair of extended pivot pins 64, so that during a linear portion of the travel of the chain, the pocket structure 60 will be positively located in position. The slots 65 accommodate the relative movement between the chains and the frame when the pocket structure is passing around a turn in its path of travel.

The frame 61—62 (Figures 1, 3 and 8) also includes a laterally projecting apertured portion or boss 62 which provides a mounting for the pocket element 66. The pocket element 66 is provided on one side with a concave surface or feed pocket 66a having crossed ribs 67 (Figure 3) for supporting a fruit therein after feeding of the fruit thereto during the upward travel of a pocket structure 60. As a pocket structure 60 rounds the turn at the top of the apparatus, its feed pocket 66a discharges its fruit, with the assistance of a guide chute 70, into the orienting pocket of the preceding pocket structure 60. The other side of each pocket element forms a concave orienting pocket 66b provided with an elongated bottom opening 68. The pocket member 66 is mounted for rocking movement about a transverse axis in the pocket structure, and for this purpose is provided with opposite threaded apertures to receive pivot pins or studs 69 suitably journalled in aligned apertures in the opposite side walls of the frame portion 62. It will be seen that the axis of this rocking movement of the pocket structure is horizontal and lies in a plane parallel to the path of travel of the chain.

An elongated orienting means is mounted in the pocket structure boss 62 (Figures 3, 5 and 9) and comprises a shaft 71 journalled respectively in bushings 72 in aligned apertures in the frame 61—62 and extending through a central aperture in alignment with opening 68. The shaft 71 is rotatable about a substantially horizontal axis and has two end shaft or suture locating parts or portions 73 of reduced diameter at either side of the pocket join to two central conical or indent locating parts or portions 74 having a common knurled apex connection 76. The portions 74 and 73 of the shaft are eccentric with respect to the endmost journalling portions of the shaft 71 so that in addition to its rotative movement the orienting portions 73 and 74 are given a jogging movement having an up and down component and a horizontal component with respect to a fruit in the pocket. A sprocket 77 is mounted on the end of each shaft 71 for rotation of the elongated orienting member during its downward travel along the orienting path. This sprocket 77 meshes with a chain 78 (Figure 2) and the chain 78 travels over a plurality of idler sprockets 79 and is driven from a drive sprocket 81 on a constantly running motor 82 secured on the frame structure 21. The spacing and location of the sprocket 79 provides an upwardly moving straight stretch 78a of the chain guided by the angle 37 and which coincides with the travel of the pocket structures along their orienting path and engages the small sprockets 77 during their downward travel to effect rapid rotation of the orienting element.

To assist in the orienting operation, particularly in the hunting and location of the stem indent, the pocket element 66 is subjected to a rocking movement to change the position of the fruit in a cup with respect to the shaft portions of the elongated orienting element. Each pocket element 66 (Figures 3, 4, 8 and 9) is provided with a projecting control arm 83 carrying a roller 84 at the end thereof which engages an elongated cam member or track 86 carried by the angle 36 and having a succession of cam rises 86a and 86b. The arm 83 is spring urged counter-clockwise, as viewed in Figure 9, by a coil spring 87 extending between the journal pin 88 for the roller 84 and a suitable fastening 89 (Figure 3) on the frame of the pocket structure. The cam rises 86b being spaced closer together than the cam rises 86a and located near the end of the travel along the orienting path near its lower end, the cam track 86 has a straight portion 86c to hold the pocket element 66 level during pick-up of a fruit, and an end rise 86d to aid in fruit removal.

The operation of the orienting structure in providing the desired location of a fruit during its travel along the orienting path will be described in detail hereinafter.

Referring to Figures 1 and 14 to 18 a feed mechanism 24 is provided for feeding a fruit into each pocket passing thereby and this feed mechanism is constructed so that it can be mounted at any desired elevation along the frame of the orientating apparatus in the linear travel of the pocket structure 60 upwardly along the left hand side of their path of travel as illustrated in Figure 1. The feed mechanism comprises a pocket 91 secured on a shaft 92 which is journalled in a boss 93 of a frame casting 94 bolted to the respective side castings 31 and 32. Other mounting stations 95 are provided on the side plates 33 and 34. The pocket 91 has adjacent thereto a fruit control pawl 96 and an inclined feed trough 97 having a V belt 98 forming the bottom thereof and fed from a suitable source of supply 99 such as a conventional "merry-go-round" conveyor structure. The V belt 98 is journalled on suitable pulleys 101, the shaft of one of which carries a bevel gear 102 (Figure 17) driven from a bevel pinion 103 on a stub shaft 104 journalled in suitable bosses 106 of the frame casting 94. The shaft 104 carries a sprocket 107 which is driven through a chain 108 from a sprocket 109 (Figures 2 and 17) secured on the shaft 53.

Means are provided for oscillating the pocket 91 to effect discharge of a fruit therefrom at the proper moment into each of the pocket structures 60 passing thereby. This same movement is utilized to operate the pawl 96 to control movement of the row of fruit in the feed trough 97. As seen in Figures 1 and 17, the sprocket 107 carries an eccentric pin 111 connected by a rod 112 to a rock arm 113 of the shaft 92. As seen in Figure 18, operation of the rock shaft 92 will move the pocket 91 to discharge a fruit into an ascending pocket structure 60. A guide chute 116 (Figures 17 and 18) having opposite inclined side portions is disposed between the frame plates 33 and 34 to assist and direct a fruit into an ascending pocket structure 60.

The pawl 96 (Figures 14 and 16) is pivotally mounted by a pin 117 in a block 118 on the frame casting 94 and is urged by a spring 119 against the hub 101a of the adjacent pulley 101 at its top. The pawl 96 is provided also with a tail 96a which lies under a depending flange 91a of the pocket 91. As seen most clearly in Figure 17 the pawl is split and has two portions lying at either side of the belt 98 and the adjacent pulley 101, the pawl portions being provided with stop ends 96b and with inclined stop rises 96c to be operative with respect to the fruit in different positions. As seen in Figure 16, the stop rises 96c are operative with respect to the fruit to restrain the row of fruit on the belt 98 while the pocket is in dumping position. As the pocket 91 is returned rapidly to its fruit receiving position, its flange 91a engages the tail 96a of the pawl 96 and moves the pawl rapidly from the position shown in Figure 16 to that shown in Figure 14. This places the stop ends 96b of the pawl in operative relation with a fruit and literally throws the fruit resting on the pawl into the pocket structure. This movement of a fruit into the feed pocket 91 is assisted by a curved guide end 121a (Figures 14 and 17) of a side rail 121 of the conveyer.

The transfer mechanism disclosed herein comprises means for grasping an oriented peach while it is resting in the cup and means for swinging the peach from the orienting mechanism and impaling it in oriented position upon a blade of a peach pitter, this mechanism being operated in synchronism with the peach pitter. The transfer mechanism includes means for traveling in a linear direction with the orienting apparatus and the peach in a pocket structure therein, so as to pick up the peach securely in its oriented position and thereby present it in the desired position to the peach pitting mechanism.

Figure 11:
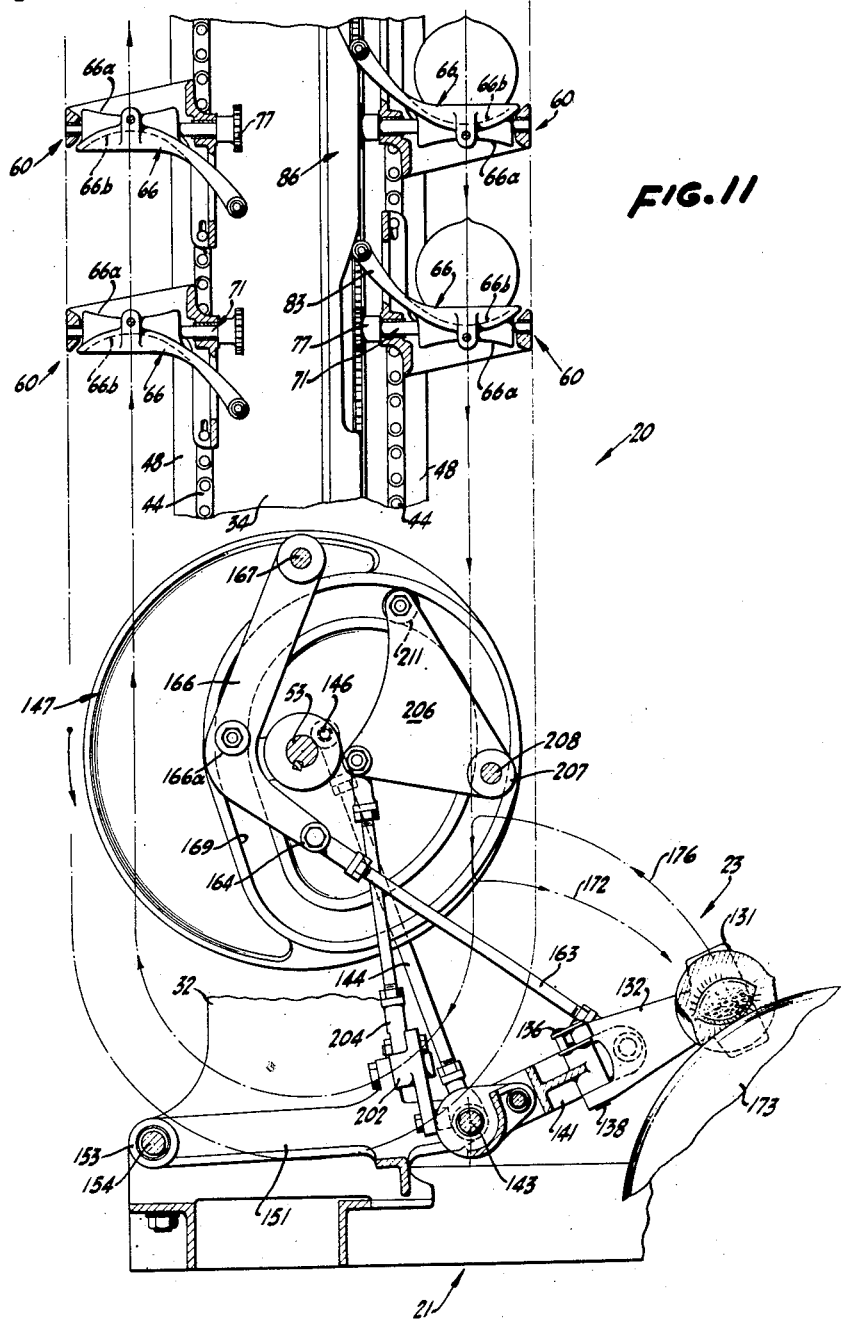
Figure 11 is a sectional elevational view taken as indicated by the line 11—11 in Figure 2.

Referring to Figures 1, 5 and 11, the transfer mechanism includes a pair of opposed peach gripping jaws 131 carried at the upper ends of respective arms 132 and 133. The jaws 131 present respective concave surfaces to grip the peach having transverse ribs 134 on the peach gripping surface. The jaw levers 132 and 133 are connected by a link 136 pivoted respectively to the inwardly projecting arm portions 137 thereof. The pivot pins 138 for the respective arms 132 and 133 are mounted in spaced apart apertured ears 132a and 133a and in respective bosses 139 at the upper end of a swinging bracket member 141. Member 141 has respective split clamping bosses 142 which engage a shaft 143 supported by respective links 144 pivotally connected at their upper ends to respective eccentric drive pins 146 on the drive shaft 53. The pins 146 are carried respectively by the gear 54 and a cam member 147 referred to hereinafter. A movement control link 151 (Figures 1, 5 and 8) for the pivot shaft 143 and brackets has a pair of bosses 152 having journalled engagement with the shaft 143 and extending to the left therefrom as shown in Figure 11 and having a boss 153 pivoted on a cross shaft 154 extending between the respective frame castings 31 and 32.

Figure 19:
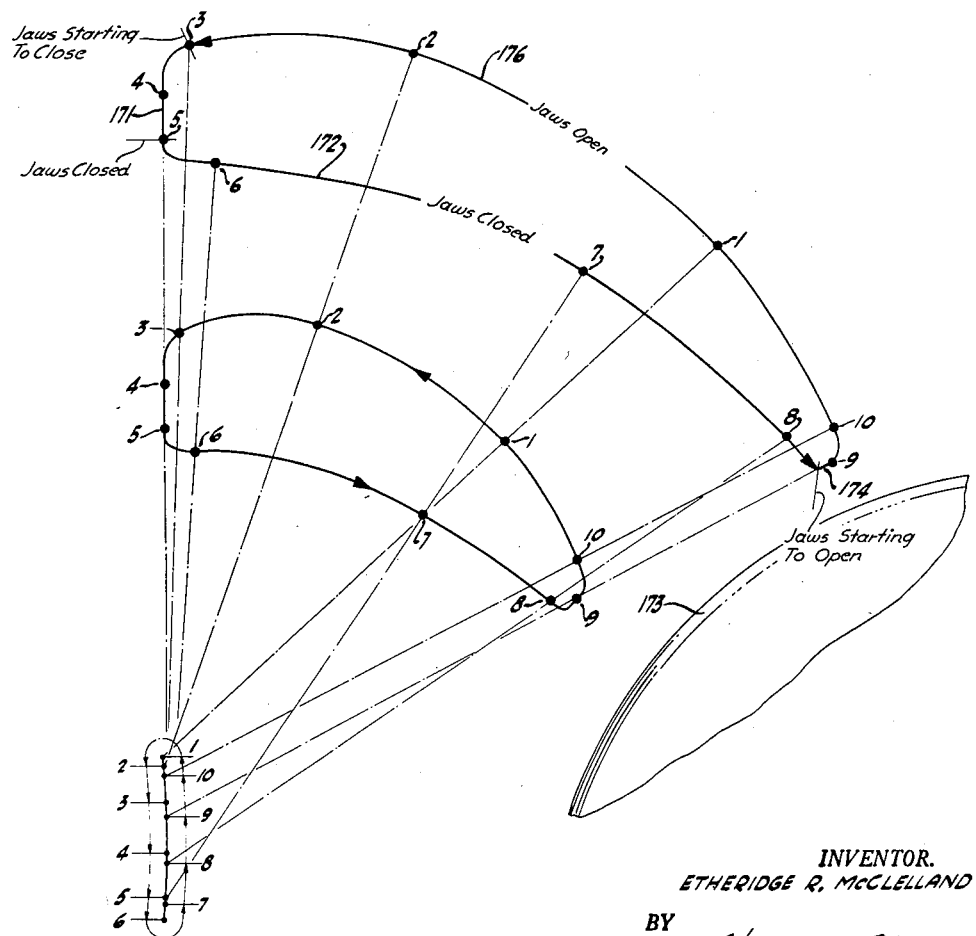
Figure 19 is a schematic view of the transfer mechanism illustrating the timing.

From the above description it will be seen that operation of the links 144 by their eccentric drive serves to move the jaws 131 vertically in a timed movement, and means are also provided to rock the jaw-supporting bracket in timed relation to the vertical movement, and to open and close the jaws also in timed relation to the other two movements. To control rocking movement of the jaws to and from the orienting apparatus and the pitter; i. e., between the positions thereof shown in Figures 8 and 11, the support bracket 141 (Figures 5 and 11) has a boss 161 in which a pivot pin 162 is mounted for a control link 163 which extends upwardly and to the left therefrom as shown in Figure 11, and has a pivotal connection at 164 with a lever 166 at its upper end pivotally mounted at 167 in a boss 168 of the frame bracket 32 (Figure 2). Intermediate its ends the lever 166 (Figure 11) has a cam follower roller 166a engaged with a cam track 169 in the cam member 147 and the movement of the lever 166 under the control of the cam track 169 produces a back and forth movement of the jaws about their pivotal axis 143 in timed relation to the opening and closing thereof and in timed relation to the raising and lowering of their pivot axis 143. The cam 169 provides effectively a dwell at each end of the movement so that the path of the jaws 131 as indicated in Figures 11 and 19 include a vertical portion 171 when the jaws are in alignment with a pocket structure and are travelling downwardly at the same rate of speed being moved from open to closed position as later described, a portion 172 in which the jaws are travelling toward the impaling blade 173 of the peach pitter, an end portion 174 in which the jaws have a slight movement along the impaling blade 173 and then a return path of movement 176 when they are returned to the upper portion of the path 171.

As previously stated, means are provided for opening and closing the jaws in timed relation to the orienting apparatus and the peach pitter so that they are closed upon a peach in a pocket. The pocket then recedes from the peach and is then transferred to the blades with the jaws closed and after impaling of the peach upon the blade 173, the jaws are opened and returned in their opened condition to alignment with the next succeeding pocket structure of the orienting apparatus. Referring to Figures 5, 8, 10 and 11, the arm 133 for one of the jaws 131 is provided with a depending portion 181 which has a split end carrying respective pivot pins 182 (Figures 5 and 5a) engaging an apertured block 183 which receives a shaft 184 whose head 186 is positioned for engagement with a stop screw 187 which limits closing movement of the jaws. The reduced thread end 188 of shaft 184 carries a thimble 189 passing freely through a boss 191 of the bracket member 141. A spring 192 surrounds the shaft 184 and is engaged with the block 183 at one end and an apertured flange 194 of an operating member 196 having respective bosses 197 and 198 slidably engaged with the shaft 143. A washer 195 is placed on shaft 184 between flange 194 and the end of thimble 189.

The operating sleeve or member 196 (Figures 5 and 7) is provided with a slotted portion 199 which is engaged by a pin 201 secured in a depending arm of a bellcrank 202 which is pivoted by a pin 203 in the bracket member 141. The other arm of the bellcrank 202 is pivotally connected to a link 204 (Figures 5, 10 and 11) which is connected at its upper end to a cam follower member 206 which has a boss 207 pivoted on a pin 208 carried by the frame casting 32. The cam follower lever 206 has a cam follower roller 211 engaging in the cam track 169 in trailing relation with respect to the cam roller 166a of the jaw swinging mechanism. The jaws 131 (Figures 11 and 20) are moved from open to closed position during travel of the jaws along their path portion 171, remain closed during the travel of the jaws along their path portion 172, are opened near the end of their travel along the path portion 174 and remain open during their travel along the path portion 176.

It will be seen that the jaw closing movement is effected through the spring 192 (Figures 5 and 10) so that the jaws 131 yieldably engage a peach and accommodate themselves to differences in diameter. Also the adjustment of thimble 189 determines the amount and timing of positive opening movement of the jaws.

In the pitter, there is provided a pusher or feeder of conventional construction for engaging the peach impaled on the blade 173 after it is released by the jaws 131 and this pusher comprises a pin 216 (Figure 1) having a tapered end for engaging the stem indent of the peach, the pin 216 being carried at the upper end of a swinging arm 217 which is pivotally mounted at 218 and operated through an arm 219 and a link 221 from a suitable drive mechanism of a conventional peach pitter. This pitter may be of the type disclosed in the patent to Perrelli et al. No. 2,336,123.

The operation of the apparatus will be described with reference to peaches. Peaches are fed one by one by the pocket 91 (Figures 1, 17 and 18) of the feed mechanism to the respective feed pockets 66a which are in peach receiving position in the ascending run of the pocket structures 60. These peaches as they are carried around the upper turn of the pocket path (Figure 1) are deposited from the feed pocket 66a of one pocket structure 60 into the orienting pocket 66b of the immediately preceding pocket structure 60, the guide casing or chute, 70 being provided to insure the peach being delivered into the pocket 66b. As a pocket structure 60 starts its downward travel, the sprocket 77 of the pocket engages the straight run of the chain 78 (which may be either ascending or descending) and is revolved rapidly with its shaft 71. At about the same time the roller 84 of the pocket element 66 engages the vertical cam member 86 and is rocked alternately back and forth by the cam rises 86a at the upper end of the track. This serves to re-orient or shift the peach repeatedly with respect to its rotating cone structures 74 as shown in Figure 9.

The cone portions 74 operate to revolve the peach rapidly about shifting horizontal axes until its elongated stem indent becomes engaged over or registers with the conical portions 74 of the shaft 71 and so turning of the peach about a horizontal axis will cease. By virtue of the reversing of the position of the pocket element 66 as illustrated in Figure 9, the tendency of some peaches to establish a stable position of rotation will be interrupted, and the stem indent will be rapidly aligned with the shaft 71 and engaged over the conical portions 74 thereof. It will be noted in Figure 9 for example, in the upper view, the peach is engaged with the right hand conical portion 74 in the middle position, the pocket structure has been oscillated counter-clockwise so that the peach has been rolled over to the left hand conical portion. In the bottom position the pocket has been oscillated clockwise so that the peach is again engaged with the right hand conical portion 74 and its axis of rotation again shifted. This operation continues as the pocket structures descend and the oscillation of the pocket element 66 is made more rapid by the greater frequency of the cam rises 86b as the end of the travel approaches.

As stated above, this indent hunting operation on a peach by the orienting mechanism is to locate the stem indent in a downward position, and then the orienting mechanism operates to orient the peach with respect to the elongated shape of the stem indent and place it in alignment with the elongated orienting member or shaft 71. It will be recalled that the conical portions 74 and the end shaft portions 73 are mounted eccentrically with respect to their axis of rotation as indicated in Figure 9 for example, so that in addition to the rotative effect, there is a continual jogging effect imparted to the peach, which has both a vertical and a horizontal component of motion. By virtue of the shifting of the peach from one side of the center point 76 of the elongated member, the horizontal component of the jogging action will have the same turning effect in rotating a misaligned peach about its stem-blossom axis.

After the stem indent settles over the conical portion 74, the principal orienting effect of the straight shaft sections 73 which are also eccentric with respect to their directional rotation, takes place. To secure the alignment of the suture line of the peach in the desired position, the jogging and rotating effects of these straight shaft portions 73 operate in the outer more constricted portions of the stem indent. It will be recalled that the rocking movement of pocket element 66 continues throughout its orienting travel, so that after the stem indent registers with the conical portions 74 of the shaft 71, the respective shaft sections 73 become active alternately with respect to the shallow end portions of the stem indent. This is because the relative vertical movement of the orienting means 71, 73, 74, and the element or support 66, shifts the point of engagement of the orienting means parts 73, 73, with the fruit in the support 66 horizontally with reference to the support 66. By reference to Figure 9, it will be seen that, with the support 66 and orienting means 71 in the positional relation shown at the top of the figure, the outer suture locating means 73 is at a comparatively high level relative to the support 66, and the inner suture locating means 73 is at a comparatively low level relative to the support 66. On the other hand, with the support 66 and the orienting means 71 in the positional relation shown in the middle assembly 66, 71, the inner suture locating means 73 is at a comparatively high level relative to the support 66 and the outer suture locating means 73 is at a comparatively low level relative to the support 66. The jogging and rotative action or effect of the end shaft portions 73 serve to rotate the peach about its stem-blossom axis until the shaft sections 73 register with the outer ends of the oval stem indent. This places the suture line of the peach in a plane containing the axis of the orienting shaft 71. In this position, the peach is stable.

It is to be noted that the various orienting actions are applied to the peach while it is traveling through a vertical path and no force components are imparted to the fruit by its travel along its path to disturb the orienting action of the pocket structure. Also after a peach is properly oriented, either at the beginning of its travel along the orienting path or near the end, its oriented position will not be disturbed.

This vertical straight line travel of the peach during orientation and after it is oriented provides for advantageous pick-up of the peach by the transfer mechanism, whose jaws 131 travel with the peach during pick-up.

Figure 10:
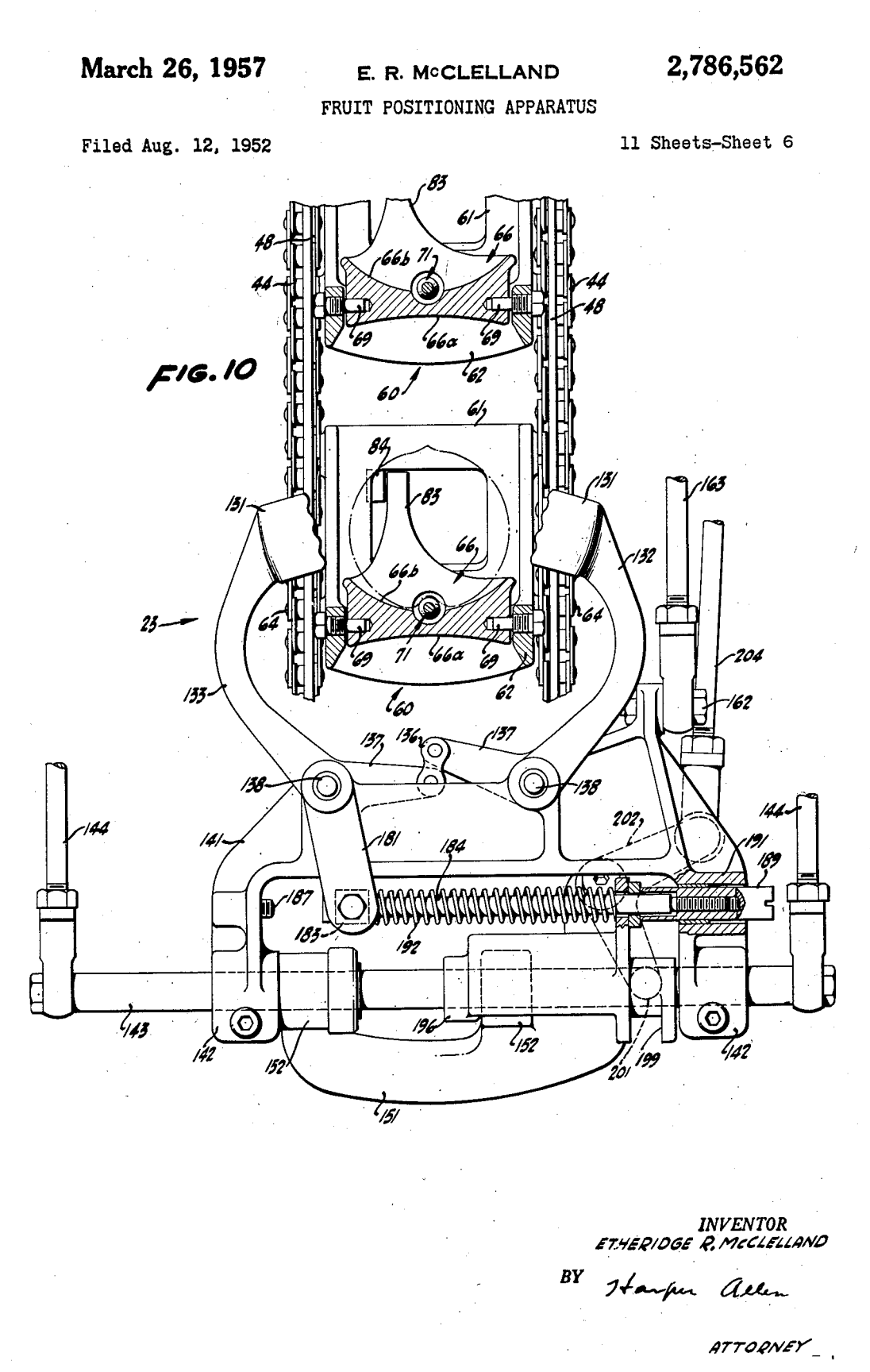
Figure 12:
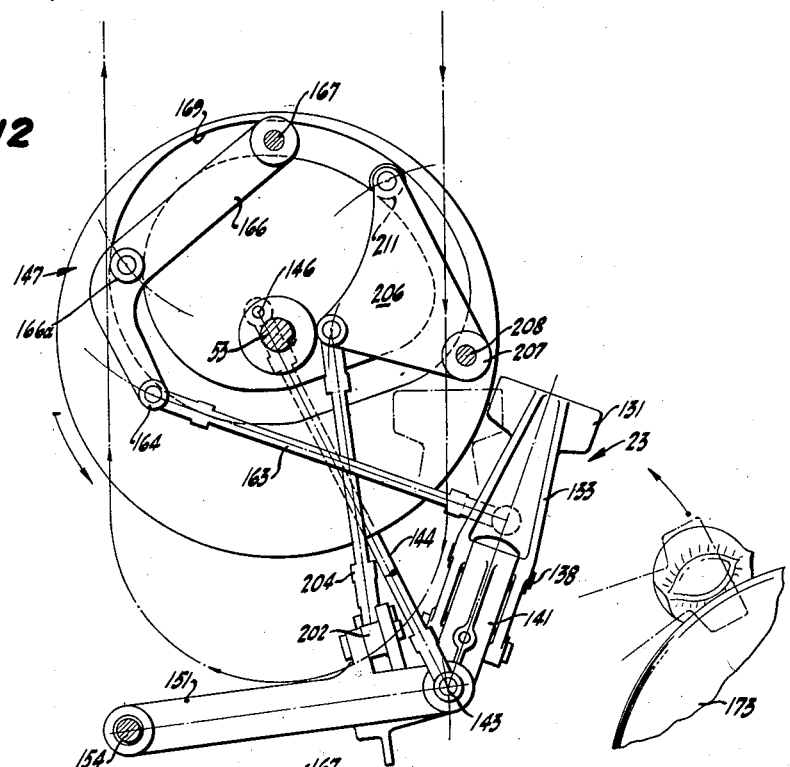
Figure 12 is a view similar to Figure 11, but showing a different operative position of the parts.
Figure 13:
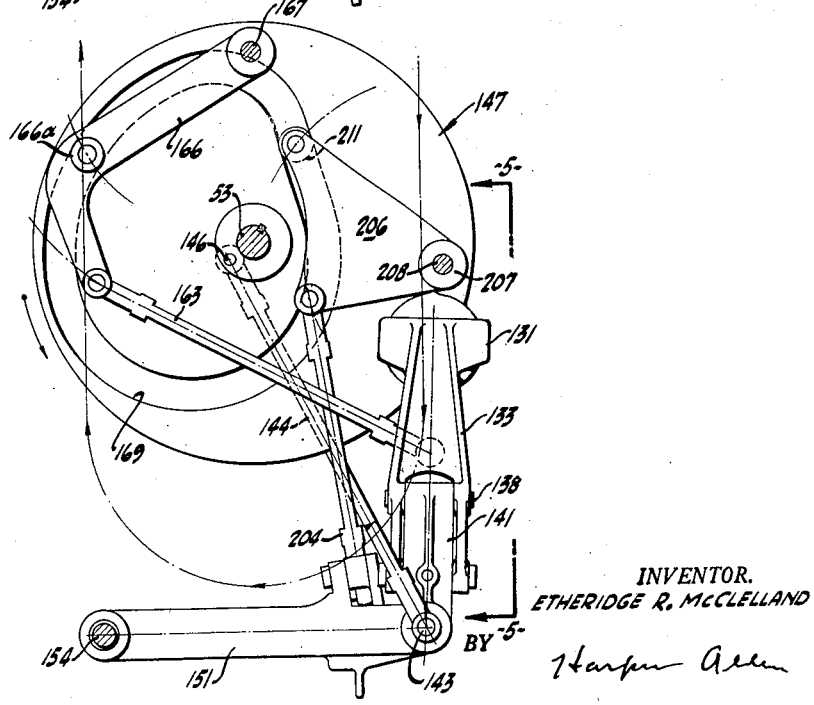
Figure 13 is a view similar to Figures 11 and 12 showing still another operative position of the parts.

As the pocket structures 60 arrive at the lowermost part of their downward travel as illustrated in Figure 1, the jaws 131 are in the open position shown in Figure 10, also illustrated in dotted lines in Figure 12. Figure 19 illustrates a suitable timing diagram of the various movements imparted to the transfer jaws 131, the movements are illustrated from an arbitrary starting point 1, and show the path of movement of the jaws 131 and their point of pivotal support and indicates the open or closed condition of the jaws along the path. At or adjacent to the point 3 in the travel of the jaws between pick-up and delivery position, i. e., when the leading edge of a jaw is past the center of the pocket, the jaws will start to close but will not close sufficiently to engage a peach until they begin the straight line path of travel illustrated in the portion 171 of the path and containing the points 4 and 5. The jaws should be closed upon the peach of smallest diameter by the time they arrive at the point 5. Referring to Figures 8 and 10, the jaws 131 start to close upon the peach and also start the vertical downward travel during their path portion 171 during which time the jaws grasp the oriented fruit and hold it so that the pocket structure then recedes from beneath the fruit leaving it free to be carried along the path 172, the pocket element 66 being tipped by the end cam rise 86d to provide for clearance of the pocket. The peach then travels along the path portion 172 and is impaled on the supporting blade 173 in position for the advancing peach feed pin or pusher 216 of the pitter to engage the fruit after it is released by the jaws and push it around the blade 173 into the peach pitter for subsequent processing. Subsequently the jaws 131 travel back along the upper path portion 176 in time for the next succeeding peach in the next succeeding pocket structure 60.

While I have shown and described a preferred embodiment of the invention, it will be understood that the invention is capable of variation and modification from the form shown, so that its scope should be limited only by the proper scope of the claims appended hereto.

I claim:

1. In a peach positioning mechanism, a pocket structure including a peach support mounted for rocking movement about an axis, means for rocking said support about said axis, a peach orienting member extending across the bottom of said support in a direction at right angles to the axis of said rocking movement, whereby the respective ends of said orienting member are alternately brought into engagement with a peach in the support, and means for moving said orienting member relative to said support.

2. In a fruit positioning mechanism, a pocket structure including a fruit support mounted for rocking movement about an axis, means for rocking said support about said axis, a fruit indent locating member centrally disposed in said support, and means for moving said member relative to said support.

3. In a peach positioning mechanism, a pocket structure mounted for movement along a vertical path, said pocket structure including a peach support mounted for rocking movement about an axis, means for rocking said support about said axis as said pocket structure moves along said path, a peach orienting member extending across the bottom of said support in a direction at right angles to the axis of said rocking movement, whereby the respective portions of said orienting member are alternately brought into engagement with a peach in the pocket structure, and means for operating said orienting member.

4. In a fruit positioning mechanism, a pocket structure including a horizontally disposed apertured fruit support, fruit orienting means located in the aperture of said support and having horizontally spaced parts alternately engageable with the fruit in said support, means mounting said orienting means for rotation about a substantially horizontal axis and mounting said orienting means and said support for relative vertical movement to shift the point of engagement of said orienting means parts with the fruit in said support horizontally with reference to said support, and means for effecting such relative vertical movement of said orienting means and said support and for rotating said orienting means.

5. In a fruit positioning mechanism, a pocket structure including a horizontally disposed apertured fruit support, fruit orienting means located in the aperture of said support and having horizontally spaced parts alternately engageable with the fruit in said support, means mounting said orienting means for rotation about a substantially horizontal axis and mounting said orienting means and said support for relative rocking movement about a substantially horizontal axis to shift the point of engagement of said orienting means parts with the fruit in said support horizontally with reference to said support, means mounting said pocket structure for movement along a path, means disposed along said path to effect said relative rocking movement between said orienting means and said pocket structure, and means for rotating said orienting means.

6. In a fruit positioning mechanism, a pocket structure including an apertured fruit support, fruit orienting means located in the aperture of said support and having horizontally spaced parts alternately engageable with the fruit in said support, means mounting said orienting means for rotation about a substantially horizontal axis and mounting said orienting means and said support for relative vertical movement to shift the point of engagement of said orienting means parts with a fruit in said support horizontally with reference to said support, means mounting said pocket structure for movement along a path including a vertical path portion, and means disposed along said vertical path portion for effecting said relative vertical movement between said orienting means and said support and for rotating said orienting means.

7. In a peach positioning mechanism; a pocket structure including a frame, a concave peach supporting pocket element mounted for rocking movement relative to said frame about an axis and having a bottom aperture, an elongated peach orienting member comprising a shaft having respective central conical portions tapering from a common apex and end shaft portions of smaller diameter extending outwardly from said conical portions, said member being positioned in said aperture and having respective end portions journalled in said frame about an axis eccentric with respect to said conical shaft portions and said end shaft portions extending outwardly therefrom; means for carrying said pocket structure along a path; and means disposed along said path for rotating said orienting member and for rocking said pocket element, said orienting member being disposed at right angles to the axis of rocking of said pocket element.

8. In a peach positioning mechanism; a pocket structure including a frame, a concave peach supporting pocket element mounted for rocking movement relative to said frame about an axis, and having a bottom aperture, an elongated peach orienting member comprising a shaft having an enlarged central portion and end shaft portions of smaller diameter extending outwardly from said central portion, said member being positioned in said aperture and being journalled in said frame; means for carrying said pocket structure along a path; and means disposed along said path for rotating said orienting member and for rocking said pocket element, said orienting member being disposed at right angles to the axis of rocking of said pocket element.

9. In a peach positioning mechanism; a pocket structure including a frame, a concave peach supporting pocket mounted for movement relative to said frame, and having a bottom aperture, peach orienting means disposed in said bottom aperture, said peach orienting means comprising centrally disposed stem indent locating means mounted in said aperture and respective suture line locating means disposed in a diametral line at either side of said stem indent locating means; and means for operating said orienting means and for effective relative movement of said orienting means with respect to said pocket to bring said suture line locating means into operation alternately.

10. A peach positioning mechanism as recited in claim 9 having means for carrying the pocket structure along a path including a vertically disposed path portion, and said operating means is located along said vertically disposed portion.

11. In a peach orienting mechanism, a pocket structure comprising a frame, a peach orienting pocket element in said frame having an opening in the bottom thereof and being mounted for rocking movement in said frame about an axis, a peach orienting shaft mounted in said frame at right angles to the rocking axis of said pocket element, the rocking movement of said pocket element alternately exposing said end portions above the lower surface thereof for engagement with a fruit article in the pocket element.

12. In a peach orienting mechanism, a pocket structure comprising a frame, a peach orienting pocket element in said frame having an elongated opening in the bottom thereof and being mounted for rocking movement in said frame about an axis at right angles to said elongated opening, a peach orienting shaft mounted in said frame at right angles to the rocking axis of said pocket element and having an enlarged central portion projecting upwardly through said opening and having end portions of reduced diameter extending outwardly from said central enlarged portion, the rocking movement of said pocket element alternately exposing said end portions above the lower surface thereof for engagement with a fruit article in the pocket element.

13. In a fruit orienting mechanism, a conveyer including a portion having a linear path of travel, a pocket structure mounted on said conveyer for travel therewith including a frame and a peach supporting pocket element mounted for rocking movement in said frame, a cam member extending along said path having means to intermittently rock said pocket element and being constructed to provide a greater frequency of rocking toward the end of the path of travel than at the beginning of the path of travel, an orienting member in said pocket structure of elongated shape and mounted for rotating and jogging movement with respect to said pocket structure, said orienting member including an enlarged central portion for rotating an article in the pocket element to locate the stem indent therein and having end portions of reduced diameter for engagement with the end portions of the stem indent.

14. A pocket structure for conveying along a path to receive and hold a fruit article for orientation, said pocket structure including a recessed orienting pocket on one face thereof, a recessed fruit holding pocket on the other face thereof, said recessed pockets having fruit receiving openings facing along said path and oppositely and away from each other, and means in said pocket structure for mounting an orienting mechanism.

15. In a fruit positioning mechanism, a conveyer mounted in upright position providing for upward movement of one stretch thereof and downward movement of the other stretch thereof, a series of pocket structures mounted on said conveyer having respective peach receiving pockets on opposite sides, one of said pockets being a peach carrying pocket facing upwardly along the upwardly moving stretch and the other said pocket being a fruit orienting pocket disposed to face upwardly along the downwardly moving stretch, and means for operating said orienting pocket during descent of a pocket structure.

16. In a fruit positioning mechanism, an upright frame, a conveyer mounted on said frame in upright position providing for an ascending path of one stretch thereof and a descending path of another stretch thereof, a series of pocket structures mounted in spaced relation on said conveyed and having respectively opposite facing pockets, the upwardly facing pockets in the ascending path comprising a fruit holding pocket and the upwardly facing pocket in the descending path comprising a fruit orienting pocket, mechanism disposed adjacent said ascending path for feeding fruit to said fruit holding pockets, and means for effecting transfer of a fruit from one pocket structure to the next preceding pocket structure as the pocket structure travels around the upper portion of the conveyer path.

17. In a fruit positioning mechanism as described in claim 16 in which the transfer effecting means comprises a guide mounted on said frame along the beginning of said descending path.

18. In a fruit positioning mechanism as described in claim 16 in which said fruit feed mechanism is mounted on said frame at any selected one of a plurality of positions along the ascending path.

19. In a peach positioning mechanism; a pocket structure including a frame, a peach support having a bottom aperture, peach orienting means disposed in said bottom aperture comprising respective aligned suture line locating means disposed in a diametral line across the peach support on opposite sides of the center of said support to engage the respective end portions of the oval stem indent of a peach; means mounting said peach support and said orienting means on said frame for relative movement of said peach support and said orienting means successively to two positional relations, in the first of which one of said locating means is at a comparatively high level relative to said support and the other of said locating means is at a comparatively low level relative to said support, and in the second of which positional relations said other of said locating means is at a comparatively high level relative to said support and said one of said locating means is at a comparatively low level relative to said support; and means for causing orienting action of said orienting means and for effecting relative movement between said orienting means and said peach support to bring said respective suture line locating means into play alternately.

20. In a peach positioning mechanism; a pocket structure including a peach support having a bottom aperture, peach orienting means disposed in said bottom aperture comprising respective aligned suture line locating means disposed in a diametral line across the peach support on opposite sides of the center of said support to engage the respective end portions of the oval stem indent of a peach; means mounting said orienting means and said support for relative movement successively to two positional relations, in the first of which one of said locating means is at a comparatively high level relative to said support and the other of said locating means is at a comparatively low level relative to said support, and in the second of which positional relations said other of said locating means is at a comparatively high level relative to said support and said one of said locating means is at a comparatively low level relative to said support; means for causing orienting action of said orienting means; and means for effecting said relative movement between said orienting means and said peach support to bring said respective suture line locating means into play alternately.

21. In a peach orienting mechanism, a pocket structure comprising a frame, a peach support in said frame having an elongated opening in the bottom thereof and being mounted for rocking movement in said frame about an axis at right angles to said elongated opening, peach orienting means disposed in said opening and extending at right angles to the rocking axis of said support, said orienting means comprising respective aligned suture line locating means for engaging the respective end portions of the oval stem indent of a peach, and means for effecting rocking movement of said support to alternately make said respective suture line locating means effective to engage a peach on the support.

References Cited in the file of this patent

UNITED STATES PATENTS

| Number | Name | Date |
|---|---|---|
| 1,219,077 | Buchanan | Mar. 13, 1917 |
| 1,714,131 | McHugh | May 21, 1929 |
| 2,081,441 | Willshaw et al. | May 25, 1937 |
| 2,160,319 | Swartz | May 30, 1939 |
| 2,371,783 | Sneed et al. | Mar. 20, 1945 |
| 2,502,779 | Coons | Apr. 4, 1950 |
| 2,563,443 | Wormser | Aug. 7, 1951 |
| 2,568,947 | Carroll | Sept. 25, 1951 |
| 2,572,773 | Slagle | Oct. 23, 1951 |
| 2,581,634 | Coons | Jan. 8, 1952 |
| 2,672,229 | Ewald et al. | Mar. 16, 1954 |
| 2,687,206 | Carroll | Aug. 24, 1954 |
| 2,693,267 | Metcalf | Nov. 2, 1954 |

FOREIGN PATENTS

| Number | Country | Date |
|---|---|---|
| 749,937 | France | May 15, 1933 |
| 814,681 | France | Mar. 22, 1937 |